Dec. 14, 1965  C. N. KUGLER ETAL  3,223,531
METHOD OF PROCESSING CONTINUOUS STRANDS OF ENCASED
SAUSAGE LINKS AND APPARATUS THEREFOR
Filed Sept. 10, 1962  5 Sheets-Sheet 1

INVENTORS.
CALVIN N. KUGLER &
WALTER V. MARBACH
BY
Richard S. Shreve, Jr.
ATTORNEY Dec. 14, 1965     C. N. KUGLER ETAL     3,223,531
METHOD OF PROCESSING CONTINUOUS STRANDS OF ENCASED
SAUSAGE LINKS AND APPARATUS THEREFOR
Filed Sept. 10, 1962     5 Sheets-Sheet 3

INVENTORS.
CALVIN N. KUGLER &
WALTER V. MARBACH
BY
Richard S. Shreve Jr.
ATTORNEY INVENTORS.
CALVIN N. KUGLER &
WALTER V. MARBACH
BY
Richard S. Shreve, Jr
ATTORNEY United States Patent Office 3,223,531
Patented Dec. 14, 1965

3,223,531
METHOD OF PROCESSING CONTINUOUS
STRANDS OF ENCASED SAUSAGE LINKS
AND APPARATUS THEREFOR
Calvin N. Kugler and Walter V. Marbach, Palos Heights, Ill., assignors to Union Carbide Corporation, a corporation of New York
Filed Sept. 10, 1962, Ser. No. 222,551
10 Claims. (Cl. 99—109)

This invention relates to continuous frankfurter strand cooker feeders, and more particularly to a feed unit which takes in, meters and distributes an encased link sausage strand onto a continuously advancing basket conveyor at the input end of a cooking chamber.

This application is an improvement upon the copending applications of Tauber and Olson, Serial No. 66,497, filed November 1, 1960, now Patent Number 3,125,017 and Serial No. 135,394 filed August 1, 1961 and now Patent Number 3,121,638. In that application, the string of frankfurters is transported by a conveyor through the cooking tunnel in the time necessary to cook the product in high velocity heated gas, such as air or wood smoke, circulated through the tunnel by a blower. In this rapid processing the frankfurter units are shrunk, which reduces their length such as 6 to 10 percent.

It is therefore the main object of the present invention to compensate for such shrinkage, preferably by overfeeding the frankfurter string to the conveyor and synchronizing therewith to loosely deposit the string thereon in an undulating pattern. Other objects are to lay successive transverse strands in opposite directions on the conveyor, and to cause undulations in said transverse strands in opposite directions longitudinally of the conveyor.

According to the present invention, the conveyor is advanced along a production line, and a string of frankfurters is advanced onto the conveyor at a rate faster than the conveyor. Preferably, the advancing string of frankfurters is reciprocated transversely of the conveyor, to lay a strand in one direction, then a bend, then to lay the strand in the opposite direction. The conveyor is preferably a succession of transversely extending baskets, and the bend extends from the strand in one basket to that strand in the next.

The strand is preferably reciprocated by a guide slidable transversely on a cross carriage slidable along the conveyor, the guide being connected by a link to an endless chain drive. The guide preferably carries a release trip to actuate an escapement for connecting the carriage to the conveyor to move it therewith.

Figure 1:
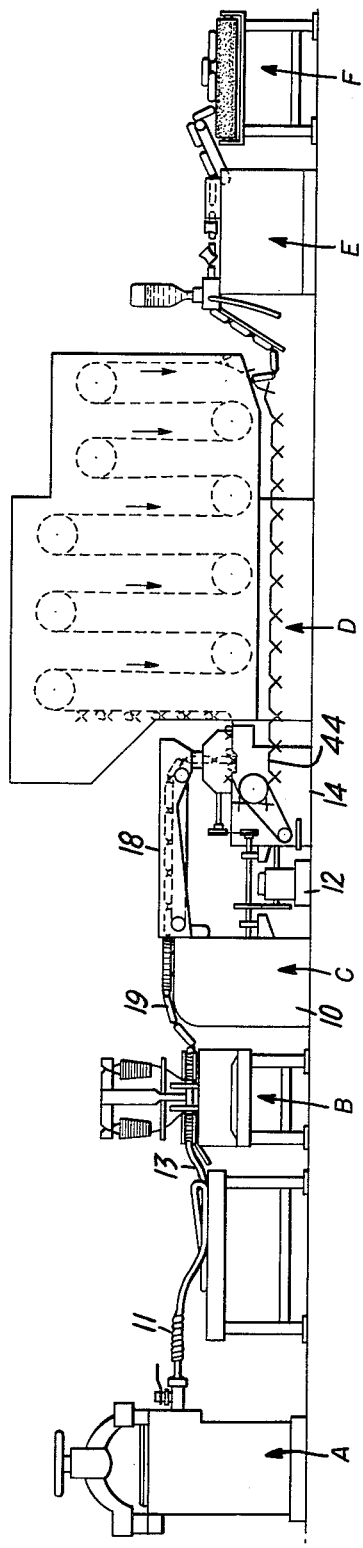
FIG. 1 is a diagrammatic elevation of a portion of a frankfurter processing line.

As shown in FIG. 1, a meat emulsion stuffing device A is provided with table for receiving encased frankfurter emulsion. Shirred, compressed cellulosic casing 11 is placed on a stuffing horn connected to a pneumatic or pump-type stuffer unit and stuffed with meat emulsion. Successive strands of stuffed casing are fastened together into a continuous strand 13 and led to an automatic linking machine B where it is continuously formed into a strand of encased sausage links 19.

The frank distributor unit C of this invention advances and distributes linked strand 19 onto a basket conveyor 44 so that it may be cooked and cooled. A cooking oven D is equipped with high velocity heated air cooking chambers and water-spray cooling chambers. A commercial peeling unit E is provided to remove the casing from the sausage links and a conveyor F is provided for removing the product to a packaging department.

Figure 2:
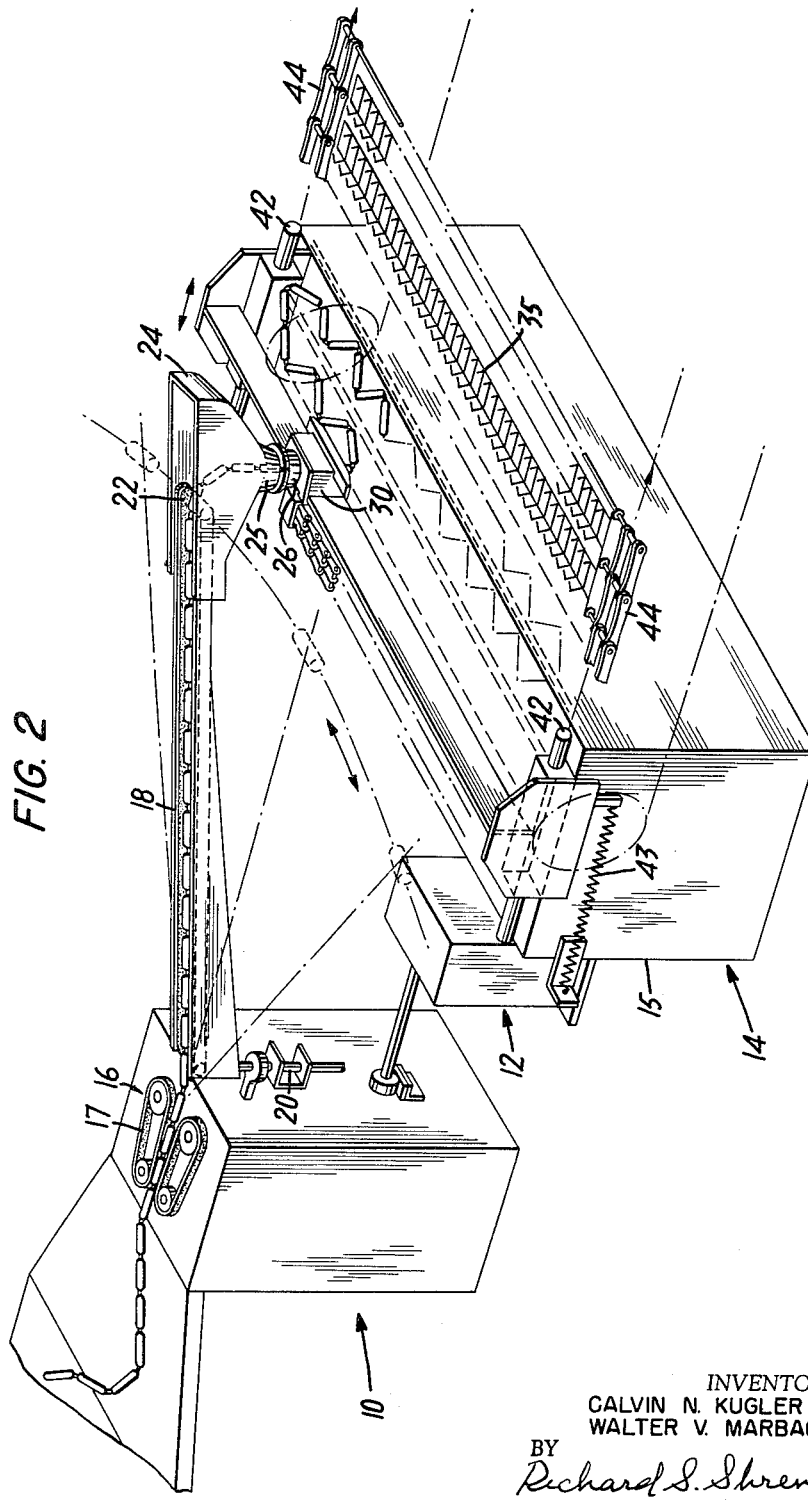
FIG. 2 is a diagrammatic perspective of the units comprising the frankfurter distributor unit of this invention.

As shown in FIG. 2, metering unit 10 has mounted on its top surface, a metering belt assembly 16. The input end of belt conveyor 18 is pivoted on fulcrum 20, mounted on the front wall of metering unit 10 immediately in advance of metering belt 16 discharge point, and thus permits radial oscillation of 18, horizontally about the fulcrum 20. Belt 22 of conveyor 18 is appropriately overdriven to the output speed of metering belt 17 by about 3 percent, by driving means connected to drive unit 12. The outer end of conveyor 18 slidably mounts funnel 24, the chute 25 of which in turn is rotatably supported in funnel bushing 26. Funnel bushing 26 is fastened to carriage 30 of traversing unit 14.

Figure 4:
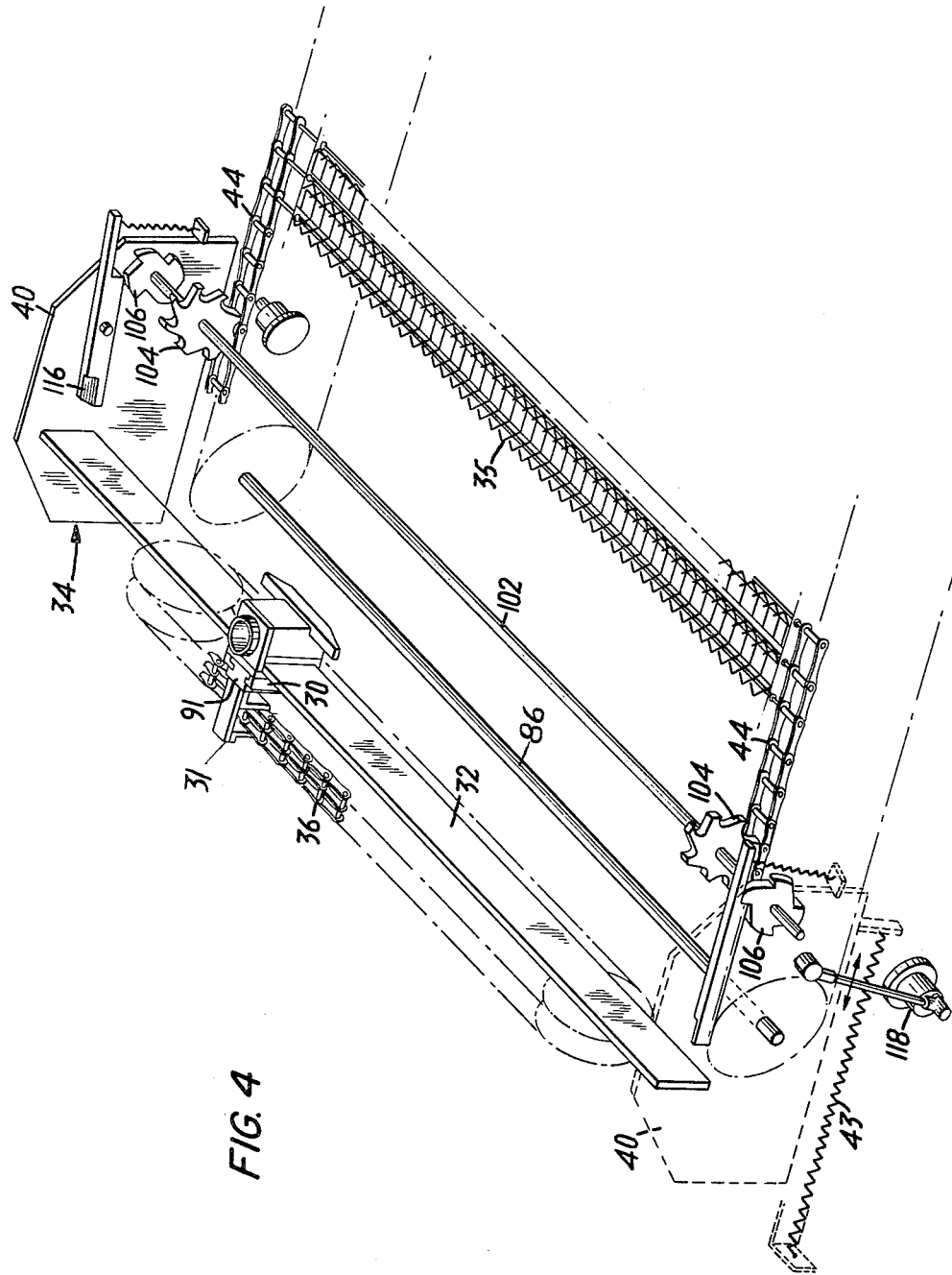
FIG. 4 is a perspective of the indexing and traversing carriage showing means for synchronizing relative movements with the conveyor.
Figure 7:
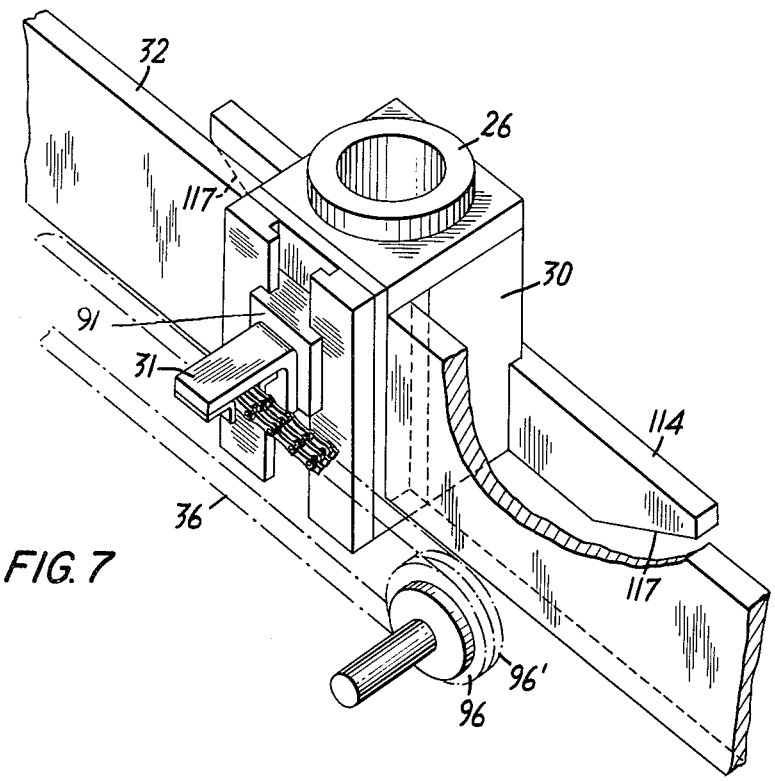
FIG. 7 is an enlarged perspective of a portion of the traversing carriage.

As shown in FIGS. 4 and 7, a traversing carriage 30 is slidably mounted on transverse slide rail 32, which is fastened at each end to side plates 40 of indexing carriage 34. Traversing carriage 30 is transversely oscillated from one side to the other of the unit baskets 35 of conveyors 44 by roller chain 36 and slide block 91. The end plates 40 of indexing carriage 34 are slidably mounted on longitudinal slide rods 42 fastened to each side of frame 15, permitting carriage 34 to be advanced by parallel, simultaneously operated conveyor roller chains 44 and retracted by extension springs 43. The indexing carriage unit 34 is made to engage successive links of basket conveyor roller chains 44, thereby indexing product chute 25 on the centerline of a unit product basket 35, and thus advancing carriage 34 with that basket during one traverse of carriage 30 across the machine.

At the termination of a single traverse of carriage 30, from one side of the conveyor to the other, an escapement arrangement is released by a trip as later described, and indexing carriage 34 is retracted by extension springs 43, to engage the next successive link of roller chains 44. This intermittently synchronizes the motion of carriage 34 in the machine direction, with a unit basket 35 of conveyor 44; and at the same time, indexes and limits the terminal point of the traversing motion of carriage 30, a predetermined distance spaced from one end wall of the indexed basket 35.

Figure 3:
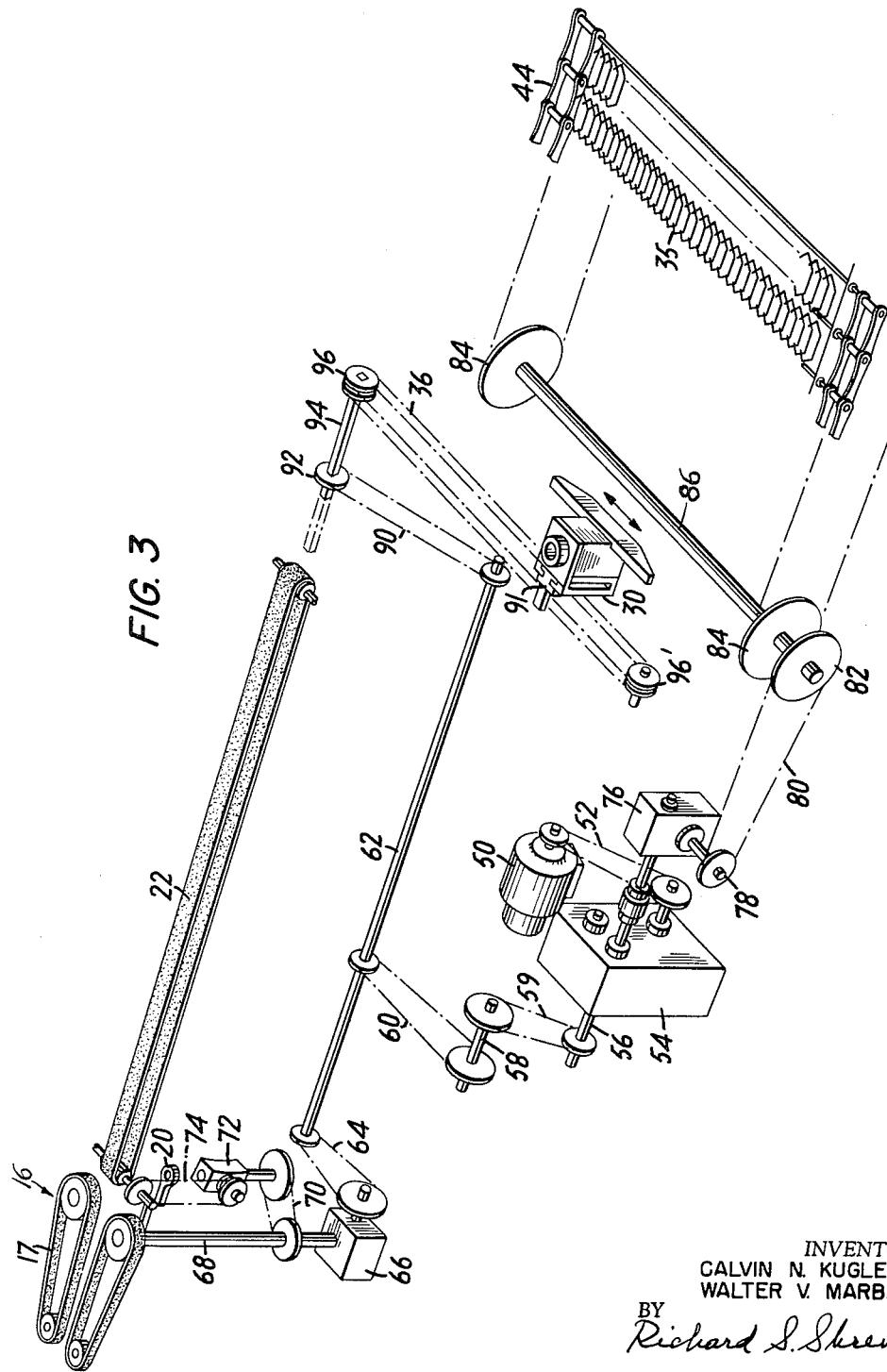
FIG. 3 is a perspective of the principal drive elements of the distributor units.

In the drive unit shown in FIG. 3, a main electrical drive motor 50 operates variable speed reducer unit 54 through appropriate roller chain drive 52. Output shaft 56 of unit 54 drives jack shaft 58 through chain drive 59. Appropriate choice of the driver and driven sprockets cooperating with roller chain drives 59 and 60 commonly connected by jack shaft 58, provides a predetermined speed relationship between the metering unit 16 and product conveyor 18, with relation to the basket conveyor unit 44. Roller chain drive 60 in turn drives line shaft 62.

Right angle drive unit 66 is driven from line shaft 62 by appropriate roller chain drive 64. Vertical output shaft 68 of unit 66 is directly connected to the metering unit assembly 16 and drives the metering belts 17, which advance the frankfurter strand to belt 22. Shaft 68 also drives right angle unit 72 through chain drive 70 and thereby through chain drive 74 drives the pulleys operating and advancing the top surface of belt 22.

The advance end of line shaft 62 operates chain drive 90, which in turn operates sprocket 92. Sprocket 92 has means for slidably engaging square shaft 94, which in turn, mounts double sprockets 96, driving the double chain drive 36, thereby traversing the slide block 91 of traversing carriage 30.

As shown in FIG. 7, double chain drive 36 operates continuously in the same direction about double chain sprockets 96, 96'. Slide block 91 is connected to chain 36 by rotatable link 31 pivoted on the block 91, and thus alternately passes from upright position in the upper flight on around the sprocket 96 to the inverted position in the lower flight of chain drive 36. Slide block 91 traverses carriage 30 on slide rail 32, traversing it across the unit basket 35 indexed therewith. The square shaft 94 (FIG. 3) fastened to double sprocket 96 slidably engages drive sprocket 92 and thus continuously oscillates traversing carriage 30 while the entire carriage unit 34 is reciprocated fore and aft in the machine direction.

Output shaft 56 of speed reducer unit 54 also drives worm gear reduction unit 76, output shaft 78 of which drives roller chain 80. Roller chain 80 drives sprockets 82 and 84, commonly mounted on shaft 86. Sprockets 84 drive the conveyor roller chains 44, to which are fastened the flexibly connected unit lattice baskets 35 of the basket conveyor unit.

As shown in FIG. 4, traversing carriage 34 has shaft 102 journaled in side plates 40. Chain escapement wheels 104 are pinned to shaft 102 and are each provided with eight teeth, shaped and mounted to engage and mesh with the rollers of conveyor chain links 44. Also pinned on shaft 102 are four-tooth ratchets 106, respectively, outboard of eight-tooth escapement wheel 104. The faces of the ratchet teeth 107 are aligned with the centerline of alternate teeth 108 of escapement wheel 104. Ratchet 106 in FIG. 5 is axially displaced 45° on shaft 102 with respect to ratchet 106 in FIG. 6.

Figure 5:
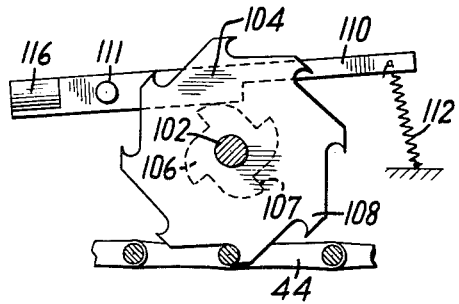
FIG. 5 is an elevation of the far chain escapement wheel.
Figure 6:
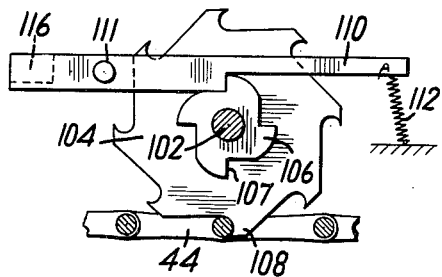
FIG. 6 is an elevation of the near chain escapement wheel.

Pawls 110 are pivoted on side plates 40 on fulcrum pins 111, and are spring-loaded with extension springs 112, to alternately engage the teeth 107 of FIGS. 5 and 6. When pawl 110 engages a tooth 107 of ratchet 106 (FIG. 6), it interlocks the teeth 108 with the respective rollers of conveyor chain 44, thereby advancing carriage 34 until the pawl 110 is disengaged. Thereupon, carriage 34 is retracted and shaft 102 is rotated counterclockwise until the following tooth 107 of FIG. 5 engages its pawl 110 on the opposite side of carriage 34 to interlock the teeth 108 with the respective rollers of conveyor chains 44 thereby advancing carriage 34 until the pawl 110 of FIG. 6 is again disengaged.

Traversing carriage 30 mounts a pawl striker 114 (FIG. 7), which has sloped surfaces 117, that displace pawl surface 116 to disengage the respective pawl 110 from ratchet 106 when carriage 30 is traversed to the desired terminus of movement adjacent each end of slide rail 32. Adjustment in the length and slope of pawl strikers 114, about the centerline of funnel bushing 26 varies the locus of traversing carriage motion reversal, and thus provides means for regulating the placement of the frankfurter strand with respect to the end walls of successive baskets 35. Traversing carriage 30 altenately strikes and displaces surfaces 116, thereby alternately disengaging pawl 110 from the respective ratchet 106, at each traverse of carriage 30. This permits escapement wheels 104 to rotate on shaft 102, thus disengaging carriage 34 from advancing roller chains 44, and releasing carriage 34 so that it is retracted by extension springs 43. An appropriate radial dashpot device 118 regulates the carriage 34 retraction speed.

It is important that the frankfurter strand 19 is loosely deposited onto the floor of the lattice baskets 35 and that sufficient slack is introduced into the strand at the basket end walls to permit it to be reversed loosely about the passage in the side walls that connect with the succeeding basket. The strand thus laid down in the baskets has enough slack to compensate for a shrinkage of about 10 percent in the length of the strand during the cooking operation.

The rate of oscillation of the chute 25 may be varied relative to the rate of advance of strand 19 on belt 22, by adjusting the ratio of teeth in the sprockets driving square shaft 94. Thus, an overfeed of strand 19 with respect to the traversing motion of chute 25 introduces the slack in the strand as it is deposited onto basket 35, thereby compensating for the shrinkage during cooking.

High velocity heated air is used to cook the frankfurter strand by the method disclosed in said copending application. The heated air is periodically redirected across the product in its passage through the cooking chambers to scrub the product surface and thus quickly promote the formation of the desired meat skin under the casing.

The combination of high velocity air and movement of the conveyor requires that the strand of sausage links be accurately and continuously positioned in the conveyor baskets so that it is not dislodged therefrom in its up and down movement through the cooking chambers. The frank strand feeder of this invention has solved this problem.

What is claimed is:

1. Method of processing continuous strands of encased sausage links, comprising the steps of:
   continuously feeding strands of encased sausage links, in a first direction transversely across a first zone, and then in a direction opposite to said first direction, transversely across said first zone;
   feeding said links to said first zone at a rate faster than the rate of formation of transverse strands, and causing each link, in each strand, to lie at an angle to an adjacent link;
   supporting and conveying to a treatment zone, said strands in the thus formed pattern of transverse strands connected by a bend, and having undulations in said transverse strands.

2. The method of claim 1, wherein said transverse strands travel through the treatment zone along an upward and downward path.

3. Method of processing continuous strands of encased meat emulsion links comprising the steps of:
   successively positioning strands of encased meat emulsion links in a first zone, in a first direction, transverse to the direction of motion of the links through said zone, and then in the opposite direction;

4. The method of claim 3, wherein said transverse strands travel through the treatment zone along an upward and downward path.

5. In the method of processing continuous strands of encased meat emulsion links by feeding continuous strands of encased meat emulsion links to a first zone, in the form of strands lying transverse to the direction in which the strands are conveyed through said first zone, and supporting and conveying said links from said first zone to a treatment zone, the improvement comprising:
   feeding continuous strands of encased meat emulsion links across a first zone, simultaneously in a first direction transverse to the direction in which the thus formed transverse strands are conveyed from said first zone and in the same direction as the direction in which said strands are conveyed,
   said links being fed to said first zone at a rate faster than the rate of formation of said transverse strands;
   feeding said links in the direction opposite to the direction in which said strands are conveyed, to form a bend;
   feeding said links simultaneously in a direction opposite to said first direction transverse to said direction in which said transverse strands are conveyed and in the same direction as said direction in which said transverse strands are conveyed;

whereby transverse strands are laid down and conveyed in an undulating pattern and the links within each transverse strand form an undulating pattern.

6. The method of claim 5, wherein said transverse strands travel through the treatment zone along an upward and downward path.

7. Apparatus for use in the processing of continuous strands of encased meat emulsion links, comprising:
a conveyor movable in a longitudinal direction and having a pair of transverse ends;
a guide member reciprocably movable transversely, from a first position at one end of said conveyor to a second position at the other end of said conveyor;
power driven feeding means positioned for cooperation with said guide member, so as to feed continuous strands of encased meat emulsion links to said guide member,
said feeding means being operatable at a speed such that the rate of delivery of said links transversely across said conveyor is greater than the rate of transverse movement of said guide member across said conveyor;
whereby a strand of links is laid in a first direction transversely across said conveyor, a bend is laid, a strand is laid transversely across said conveyor in a direction opposite to said first direction, and each link in each strand lies at an angle to an adjacent link thus forming undulations in each of the transverse strands.

8. Apparatus for use in the processing of continuous strands of encased meat emulsion links, comprising:
a conveyor movable in a longitudinal direction;
means for continuously feeding continuous strands of encased meat emulsion links to said conveyor, said means including,
a guide member simultaneously movable transversely and longitudinally of said conveyor, and
a power driven member for continuously advancing said links through said guide member, said power driven member being operatable at a speed such that the rate of delivery of said links to said conveyor is greater than the rate of transverse movement of said guide members across said conveyor;
whereby a strand of links is laid in a first direction transversely across said conveyor, a bend is laid and a strand is laid transversely across said conveyor in a direction opposite from said first direction, and each link in each strand lies at an angle to an adjacent link thus forming undulations in each of said transverse strands.

9. The apparatus of claim 8, wherein said conveyor comprises a plurality of interconnected longitudinally extending baskets, said baskets being movable along a successively upward and downward path through a cooking zone, and each of said baskets having longitudinally extending wall members, whereby said wall members retain said strands in the proper positions in said baskets during their upward and downward movement through said cooking zone.

10. Apparatus for use in the processing of continuous strands of encased meat emulsion links, comprising:
a first conveyor movable in a longitudinal direction;
means for continuously feeding continuous strands of encased meat emulsion links to said first conveyor, said means including,
a guide member, synchronization means for moving said guide member in the same direction and at substantially the same rate of speed as said first conveyor, and for simultaneously reciprocatingly moving said guide member transversely to the direction of motion of said first conveyor,
a second conveyor, said second conveyor having a first, pivoted end, and a second end, said second end being supported by and in movable contact with said guide member; whereby said guide is in continuous communication with said second end of said second conveyor as said guide member reciprocatingly moves transversely across said first conveyor.

References Cited by the Examiner
UNITED STATES PATENTS

| | | | |
|---|---|---|---|
| 1,825,528 | 9/1931 | Kundsen | 99—109 |
| 2,638,624 | 5/1953 | Wade | 99—229 |
| 2,669,378 | 2/1954 | Carruthers | 141—80 |
| 2,840,121 | 6/1958 | Carruthers | 141—164 |
| 2,973,277 | 2/1961 | Barnett et al. | 99—229 |
| 3,113,870 | 12/1963 | Barnett | 99—108 |
| 3,121,638 | 2/1964 | Tauber | 99—108 |

A. LOUIS MONACELL, *Primary Examiner.*

HYMAN LORD, *Examiner.*